United States Patent
Hsu et al.

(10) Patent No.: US 9,069,176 B1
(45) Date of Patent: Jun. 30, 2015

(54) LIQUID CRYSTAL DISPLAY APPARATUS AND THREE-DIMENSIONAL DISPLAY APPARATUS

(71) Applicant: Shenzhen China Star Optoelectronics Technology Co., Ltd., Shenzhen (CN)

(72) Inventors: Jehao Hsu, Shenzhen (CN); Chenghung Chen, Shenzhen (CN); Jingfeng Xue, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/704,637

(22) PCT Filed: Oct. 15, 2012

(86) PCT No.: PCT/CN2012/082947
§ 371 (c)(1),
(2) Date: Dec. 17, 2012

(87) PCT Pub. No.: WO2014/056236
PCT Pub. Date: Apr. 17, 2014

(30) Foreign Application Priority Data

Oct. 8, 2012 (CN) .......................... 2012 1 0377417

(51) Int. Cl.
G02F 1/1335 (2006.01)
G02B 27/22 (2006.01)
G02F 1/13363 (2006.01)
G02F 1/1368 (2006.01)

(52) U.S. Cl.
CPC ............ *G02B 27/22* (2013.01); *G02F 1/13363* (2013.01); *G02F 1/133512* (2013.01); *G02F 1/1368* (2013.01)

(58) Field of Classification Search
CPC . G02F 1/1335; G02F 1/1362; G02F 1/13363; G02F 1/133634; G02B 27/26; G02B 27/2214; G02B 5/3093; H04N 13/0404; H04N 13/0403; H04N 13/0409; H04N 9/3197; H04N 9/3167; H04N 9/3105
USPC ................................. 349/15, 9, 117
See application file for complete search history.

(56) References Cited

U.S. PATENT DOCUMENTS

2014/0078425 A1* 3/2014 Wang .............................. 349/15

* cited by examiner

*Primary Examiner* — Mike Qi
(74) *Attorney, Agent, or Firm* — Mark M. Friedman

(57) ABSTRACT

A liquid crystal display apparatus includes scan lines, data lines perpendicular to the scan lines, a first pixel, a second pixel adjacent to the first pixel, and a black matrix layer. The first pixel includes a first main pixel and a first sub pixel. The first main pixel and the first sub pixel are arranged along a direction of the scan line. The second pixel includes a second main pixel and a second sub pixel. The second main pixel and the second sub pixel are arranged along the direction of the scan line. The black matrix layer covers the first pixel and the second pixel. The black matrix layer covers portions of the first main pixel, the first sub pixel, the second main pixel, and the second sub pixel. The first pixel and the second pixel are arranged along a direction of the data line.

10 Claims, 4 Drawing Sheets

//LIQUID CRYSTAL DISPLAY APPARATUS AND THREE-DIMENSIONAL DISPLAY APPARATUS

BACKGROUND OF THE INVENTION

1. Field of the Invention

The present invention relates to a liquid crystal display apparatus, more particularly, to a film pattern retarded (FPR) three-dimensional display apparatus.

2. Description of the Prior Art

A liquid crystal display (LCD) having the advantages of light, thin, and low power consumption has been extensively applied in modern information equipment such as computers, mobile phones, and personal digital assistants. Generally speaking, a liquid crystal display comprises a liquid crystal display panel and a backlight module. Since the liquid crystal display panel is not self-luminous, the liquid crystal display relies on the light source in the backlight module to emit light. The light emitted from the light source in the backlight module passes through liquid crystals in the liquid crystal display panel, and the intensity of the light transmitted to the user is determined by the extent to which the liquid crystals rotate. The images are thus output in this manner.

With the development of technology, the viewer is no longer satisfied with the two-dimensional display technology. Therefore, the three-dimensional display technology emerges. The three-dimensional display technology allows the viewer to perceive the three-dimensional images based on parallax effect. The viewer thus be personally on the scene.

Please refer to FIG. 1, FIG. 1 is a schematic diagram showing a conventional three-dimensional display apparatus 100 and circular polarized glasses 130. The three-dimensional display apparatus 100 comprises a backlight module 110, a display panel 140, a polarizing plate 144, and a ¼λ pattern retarder plate 120.

The display panel 140 comprises a pixel matrix 141 constituted by a plurality of pixels, a color filter 142, and a liquid crystal layer (not indicated) disposed between the pixel matrix 141 and the color filter 142. The pixel matrix 141 in the display panel 140 comprises a plurality of left-eye pixel line units L and a plurality of right-eye pixel line units R. The plurality of right-eye pixel line units R and the plurality of left-eye pixel line units L are alternatively arranged. The left-eye pixel line unit L displays left-eye images based on left-eye signals, while the right-eye pixel line unit R displays right-eye images based on right-eye signals.

The color filter 142 comprises color filter units 146 for displaying three primary colors that are red, blue, and green and a black matrix layer 143 disposed between each two neighboring color filter units 146. When light passes through the color filters 146 for displaying the three primary colors, namely red, blue, and green, the corresponding red color, blue color, and green color will be displayed, but the light will not passes through the black matrix layer 143.

Light emitted from the backlight module 110 passes through the color filter units 146 and is then polarized by the polarizing plate 144 to become polarized light. The polarized direction of the polarizing plate 144 is 90 degrees from the horizontal direction A.

After that, the polarized light emitted from the polarizing plate 144 will go through the ¼ λ pattern retarder plate 120. The ¼ λ pattern retarder plate 120 has a plurality of first retarders 121 and a plurality of second retarders 122. The plurality of first retarders 121 and the plurality of second retarders 122 are arranged alternatively. The optical axes of the first retarders 121 are 45 degrees from the horizontal direction A, and the optical axes of the second retarders 122 are 135 degrees from the horizontal direction A. The light emitted from the right-eye pixel line units R, after passing through the polarizing plate 144 and the first retarders 121 will become right circularly polarized light, while the light emitted from the left-eye pixel line units L will become left circularly polarized light after passing through the polarizing plate 144 and the second retarders 122.

Finally, the right circularly polarized light and the left circularly polarized light enter the circular polarized glasses 130. The circular polarized glasses 130 are constituted by the first retarder 121, the second retarder 122, and polarizing plates 133. The optical axes of the first retarder 121 and the second retarder 122, which acts for the ¼ λ retarder plate for left-eye glass and right-eye glass, are 45 degrees and 135 degrees from the horizontal direction A, respectively. The polarized direction of the polarizing plates 133 is perpendicular to (i.e. 90 degrees from) the horizontal direction A. Therefore, the as-generated left circularly polarized light can pass through the left-eye glass, and the as-generated right circularly polarized light can pass through the right-eye glass. In the present embodiment, since the left circularly polarized light is corresponding to the left-eye signals and the right circularly polarized light is corresponding to the right-eye signals, the left eye is allowed to see only the left-eye images and the right eye is allowed to see only a the right-eye images when the viewer wears the circular polarized glasses 130. The viewer's brain thus perceives the three-dimensional images.

However, when observing three-dimensional images, a small portion of the left-eye images (or right-eye images) tends to enter the pathway of the viewer's right eye (or left eye). Hence, the phenomenon of crosstalk occurs. The extent of crosstalk will have a direct impact on the three-dimensional viewing effect.

In order to prevent the crosstalk phenomenon, the black matrix layer 143 is utilized to cover portions of two neighboring rows of pixels. Please refer to FIG. 2, FIG. 2 is a schematic diagram of relative position between the black matrix layer 143 and the pixels after the pixel matrix 141 is assembled with the color filters 142. In FIG. 2, only two rows of pixels of the pixel matrix 141 are illustrated to simplify the figure. Actually, the pixel matrix 141 comprises more pixels. In addition, only portions of the black matrix layer 143 are depicted in FIG. 2 (only the black matrix layer 143 on the border area between pixel 210 and pixel 220 is depicted). The black matrix layer 143 is actually disposed on the border areas between each two neighboring pixels to prevent light from passing through the border area between, for example, the pixel 201 and the pixel 220.

The black matrix layer 143 is utilized to cover portions of the pixels 210, 220 which belong to two neighboring rows. However, such a structure has drawbacks. The pixel 210 comprises a main pixel 212 and a sub pixel 211, and the pixel 220 comprises a main pixel 222 and a sub pixel 221. A width A1 of an area covered by the black matrix layer 143 on the main pixel 212 is smaller than a width A2 of an area covered by the black matrix layer 143 on the sub pixel 211. Therefore, the area covered by the black matrix layer on the main pixel 212 is smaller than the area covered by the black matrix layer 143 on the sub pixel 211. As a result, the domain region of the main pixel 212 is not symmetric to the domain region of the sub pixel 211 to cause the problem of view angle deflection.

Therefore, it is very important to develop a new three-dimensional display apparatus to resolve the above-mentioned problem.

SUMMARY OF THE INVENTION

The present invention provides a three-dimensional display apparatus liquid crystal in which the main pixel and the sub pixel of each of the pixels are arranged in a different manner. The problem of asymmetric display area does not exist when portions of each of the pixels is covered by the black matrix layer. As a result, the drawback of view angle deflection is avoided.

In order to resolve the above-mentioned problem, the present invention provides a liquid crystal display apparatus. The liquid crystal display apparatus comprises at least a scan line, at least a data line perpendicular to the scan line, a first pixel, a second pixel adjacent to the first pixel, and a black matrix layer. The first pixel comprises a first main pixel and a first sub pixel. The first main pixel and the first sub pixel are arranged along a direction of the scan line. The second pixel comprises a second main pixel and a second sub pixel. The second main pixel and the second sub pixel are arranged along the direction of the scan line. The black matrix layer covers the first pixel and the second pixel. The black matrix layer covers portions of the first main pixel, the first sub pixel, the second main pixel, and the second sub pixel. The first pixel and the second pixel are arranged along a direction of the data line.

In one aspect of the present invention, the liquid crystal display apparatus further comprises a first thin film transistor coupled to the scan line, the data line, the first main pixel, and the first sub pixel for transmitting a data signal transmitted from the data line to the first main pixel and the first sub pixel according to a scan signal transmitted from the scan line.

In another aspect of the present invention, the liquid crystal display apparatus is applied in a film pattern retarded (FPR) three-dimensional display apparatus.

In still another aspect of the present invention, the first pixel is used for outputting left-eye images, the second pixel is used for outputting right-eye images, and the black matrix layer is used for preventing images corresponding to one eye of the viewer from entering another eye of the viewer to avoid the crosstalk problem.

The present invention further provides a film pattern retarded three-dimensional display apparatus. The three-dimensional display apparatus comprises at least a scan line, at least a data line perpendicular to the scan line, a first pixel, a second pixel adjacent to the first pixel, and a black matrix layer. The first pixel comprises a first main pixel and a first sub pixel. The first main pixel and the first sub pixel are arranged along a direction of the scan line. The second pixel comprises a second main pixel and a second sub pixel. The second main pixel and the second sub pixel are arranged along the direction of the scan line. The black matrix layer covers the first pixel and the second pixel. The black matrix layer covers portions of the first main pixel, the first sub pixel, the second main pixel, and the second sub pixel. The first pixel and the second pixel are arranged along a direction of the data line.

In one aspect of the present invention, the three-dimensional display apparatus further comprises a first thin film transistor coupled to the scan line, the data line, the first main pixel, and the first sub pixel for transmitting a data signal transmitted from the data line to the first main pixel and the first sub pixel according to a scan signal transmitted from the scan line.

In another aspect of the present invention, the first pixel is used for outputting left-eye images, the second pixel is used for outputting right-eye images, and the black matrix layer is used for preventing images corresponding to one eye of the viewer from entering another eye of the viewer to avoid the crosstalk problem.

The present invention further provides a film pattern retarded three-dimensional display apparatus. The three-dimensional apparatus comprises at least a scan line, at least a data line perpendicular to the scan line, a first pixel, a second pixel adjacent to the first pixel, and a black matrix layer. The first pixel comprises a first main pixel and a first sub pixel. The second pixel comprises a second main pixel and a second sub pixel. The black matrix layer covers portions of the first main pixel, the first sub pixel, the second main pixel, and the second sub pixel. A width of an area covered by the black matrix layer on the first main pixel is the same as that of an area covered by the black matrix layer on the first sub pixel. The first pixel and the second pixel are arranged along a direction of the data line.

In one aspect of the present invention, the three-dimensional display apparatus further comprises a first thin film transistor coupled to the scan line, the data line, the first main pixel, and the first sub pixel for transmitting a data signal transmitted from the data line to the first main pixel and the first sub pixel according to a scan signal transmitted from the scan line.

In another aspect of the present invention, the first pixel is used for outputting left-eye images, the second pixel is used for outputting right-eye images, and the black matrix layer is used for preventing images corresponding to one eye of the viewer from entering another eye of the viewer to avoid the crosstalk problem.

The present invention provides the following advantage: The present invention provides a liquid crystal display apparatus in which the main pixel and the sub pixel of each of the pixels are arranged in a different manner. The problem of asymmetric display area does not exist when portions of each of the pixels is covered by the black matrix layer. As a result, the drawback of view angle deflection is avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
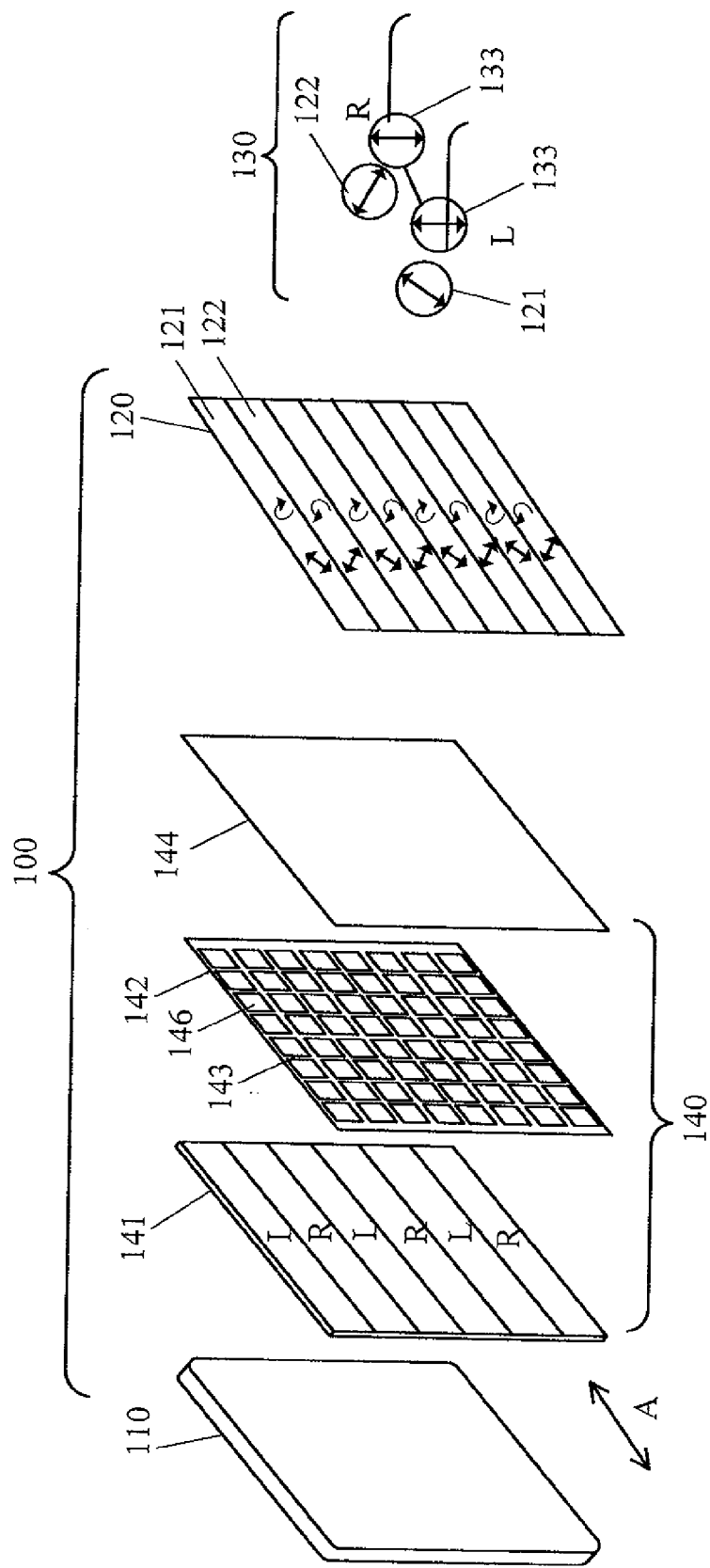
FIG. 1 is a schematic diagram showing a conventional three-dimensional display apparatus and circular polarized glasses.
Figure 2:
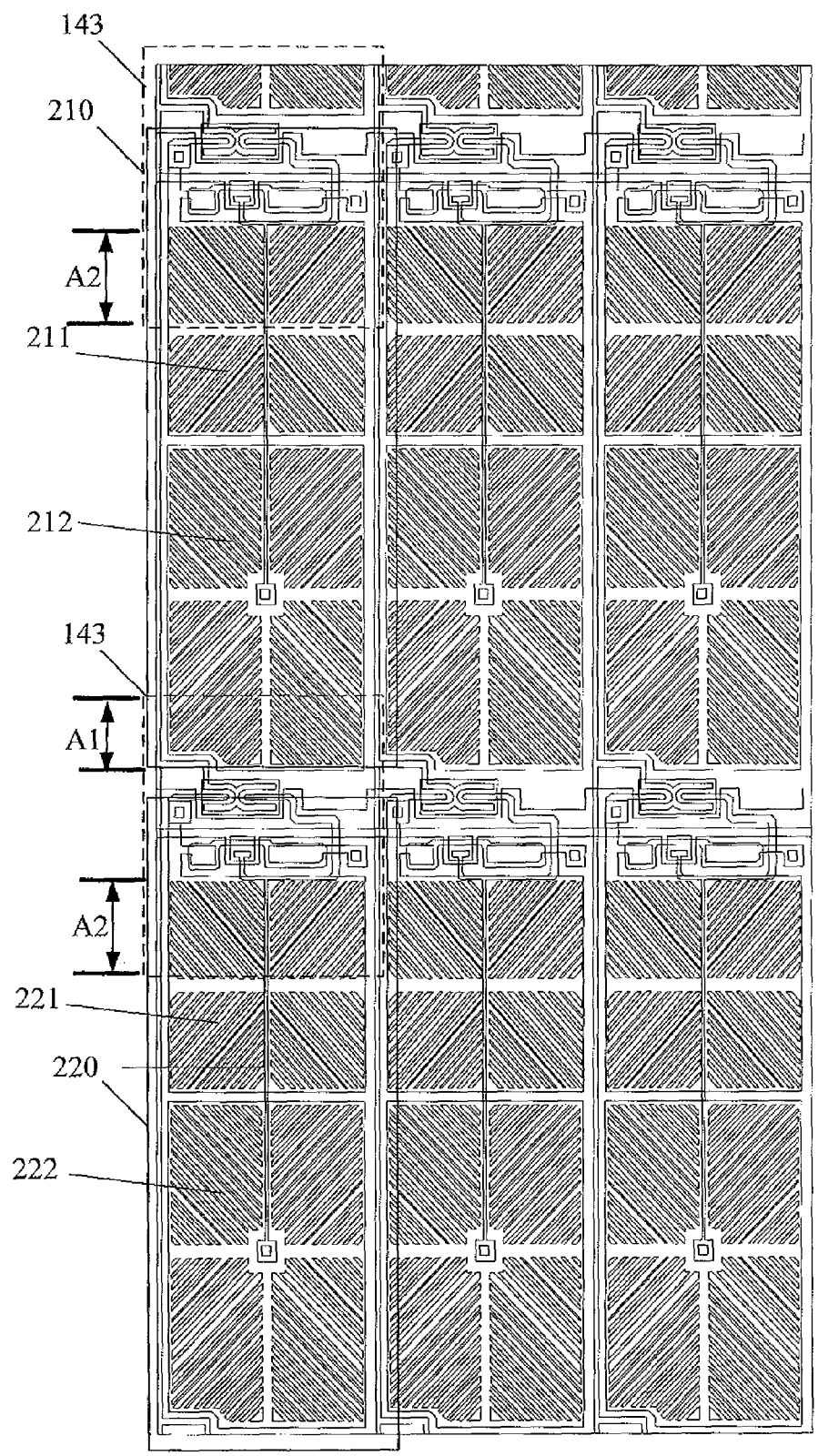
FIG. 2 is a schematic diagram of relative position between the black matrix layer and the pixels after the pixel matrix is assembled with the color filters.
Figure 3:
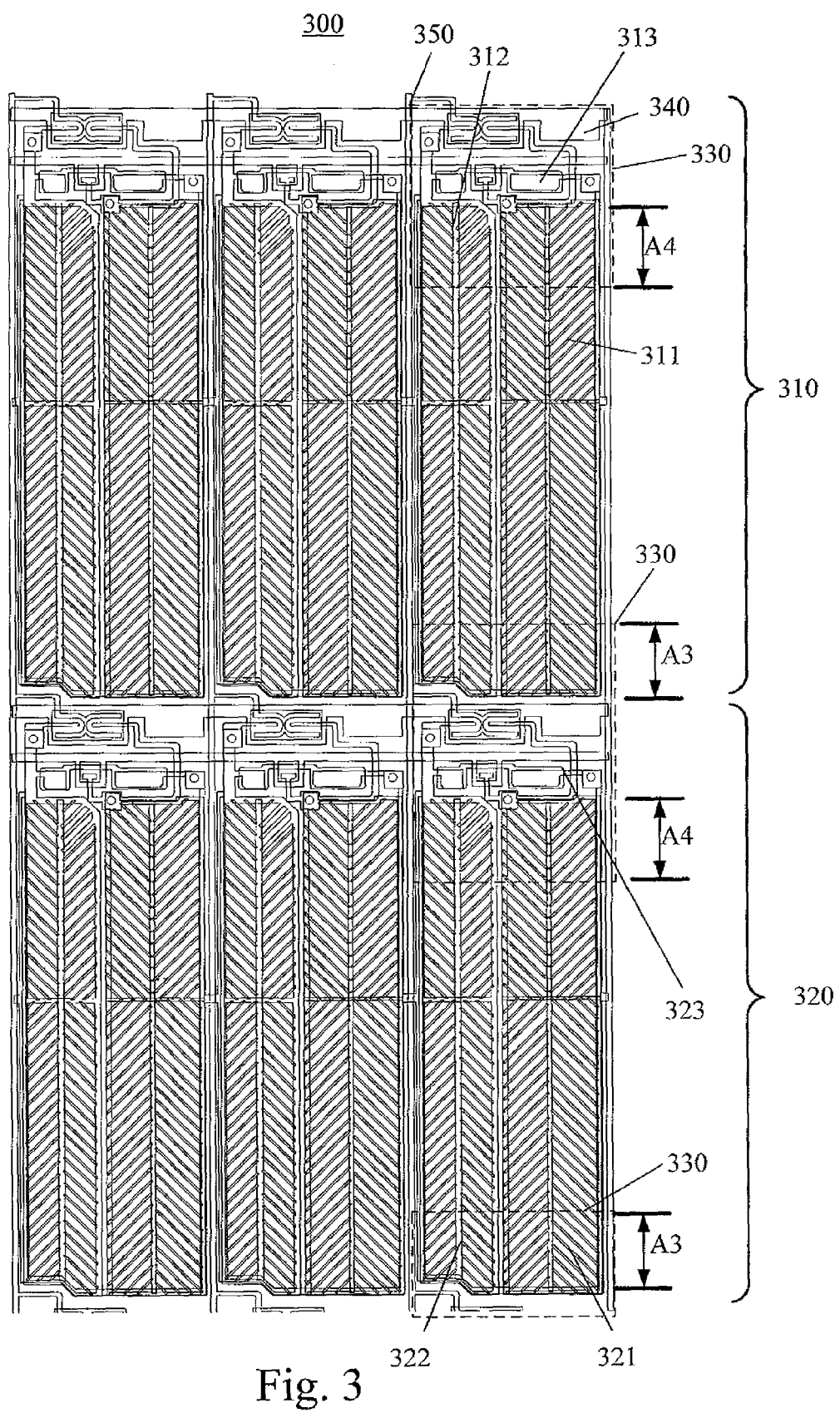
FIG. 3 is a schematic diagram showing a present invention three-dimensional display apparatus.

Please refer to FIG. 3, FIG. 3 is a schematic diagram showing a present invention three-dimensional display apparatus 300. The three-dimensional display apparatus 300 can be a film pattern retarded (FPR) three-dimensional display apparatus, and comprises a first pixel 310 corresponding to a first row, a second pixel 320 corresponding to a second row, thin film transistors 313, 323, and a black matrix layer 330. The second pixel 320 and the first pixel 310 are neighboring pixels. That means, the second pixel 320 and the first pixel 310 correspond to a same data line (they are arranged along a direction of data lines), but correspond to two neighboring scan lines (not indicated). The first pixel 310 and the second pixel 320 are utilized to display images corresponding to different eyes of the viewer. For example, the first pixel 310 may be used for displaying left-eye (right-eye) images, while the second pixel 320 may be used for displaying right-eye (left-eye) images.

The three-dimensional display apparatus 300 further comprises a plurality of scan lines 340 and a plurality of data lines 350. The plurality of scan lines 340 are perpendicular to the plurality of data lines 350. In addition, in FIG. 3 only two rows of pixels of the three-dimensional display apparatus 300 are illustrated. Actually, the three-dimensional display apparatus 300 comprises more pixels. Any alternations are within the limitation of the present invention. Furthermore, only portions of the black matrix layer 330 is depicted in FIG. 3 (only the black matrix layer 330 on the border area between first pixel 310 and the second pixel 320 is depicted). The black matrix layer 330 is actually disposed on the border areas between each two neighboring pixels to prevent light from passing through the border area between, for example, the first pixel 310 and the second pixel 320.

The first pixel 301 comprises a first main pixel 311 and a first sub pixel 312, and the second pixel 320 comprises a second main pixel 321 and a second sub pixel 322. The main pixel and the sub pixel share a same thin film transistor. In the present embodiment, the first main pixel 311 and the first sub pixel 312 share the thin film transistor 313, and the second main pixel 321 and the second pub pixel 322 share the thin film transistor 323. When the thin film transistor 313 receiving a scan signal transmitted from the corresponding scan line 340 is turned on, a data signal of the corresponding data line 350 is transmitted to the first main pixel 311 and the first sub pixel 312 of the first pixel 310. When the thin film transistor 323 receiving a scan signal transmitted from the corresponding scan line 340 is turned on, a data signal of the corresponding data line 350 is transmitted to the second main pixel 321 and the second sub pixel 322 of the second pixel 320.

In the present embodiment, the main pixel and the sub pixel are arranged in a manner different from the arrangement manner of the main pixel and the sub pixel in the prior art. As shown in FIG. 3, the first main pixel 311 and the first sub pixel 312 are arranged along the horizontal direction (arranged along a direction of scan lines 340), which is different from the now-existing structure.

The arrangement manner just mentioned above will avoid the problem caused by the prior art. The black matrix layer 330 is also disposed on portions of the first pixel 310 and portions of the second pixel 320 to cover portions of the first pixel 310 and the second pixel 320 located in tow neighboring rows. In the present embodiment, the black matrix layer 330 evenly covers the first main pixel 311 and the first sub pixel 312 of the first pixel 310, and evenly covers the second main pixel 321 and the second sub pixel 322 of the second pixel 320. Since the first main pixel 311 and the first sub pixel 312 of the first pixel 310 is horizontally arranged, widths A3, A4 of areas covered by the black matrix layer 330 on the first main pixel 311 are the same as those of areas covered by the black matrix layer 330 on the first sub pixel 312. In the same way, for the second main pixel 321 and the second sub pixel 322 of the second pixel 320, widths of areas covered by the black matrix layer 330 on them, namely A3, A4, are the same.

Figure 4:
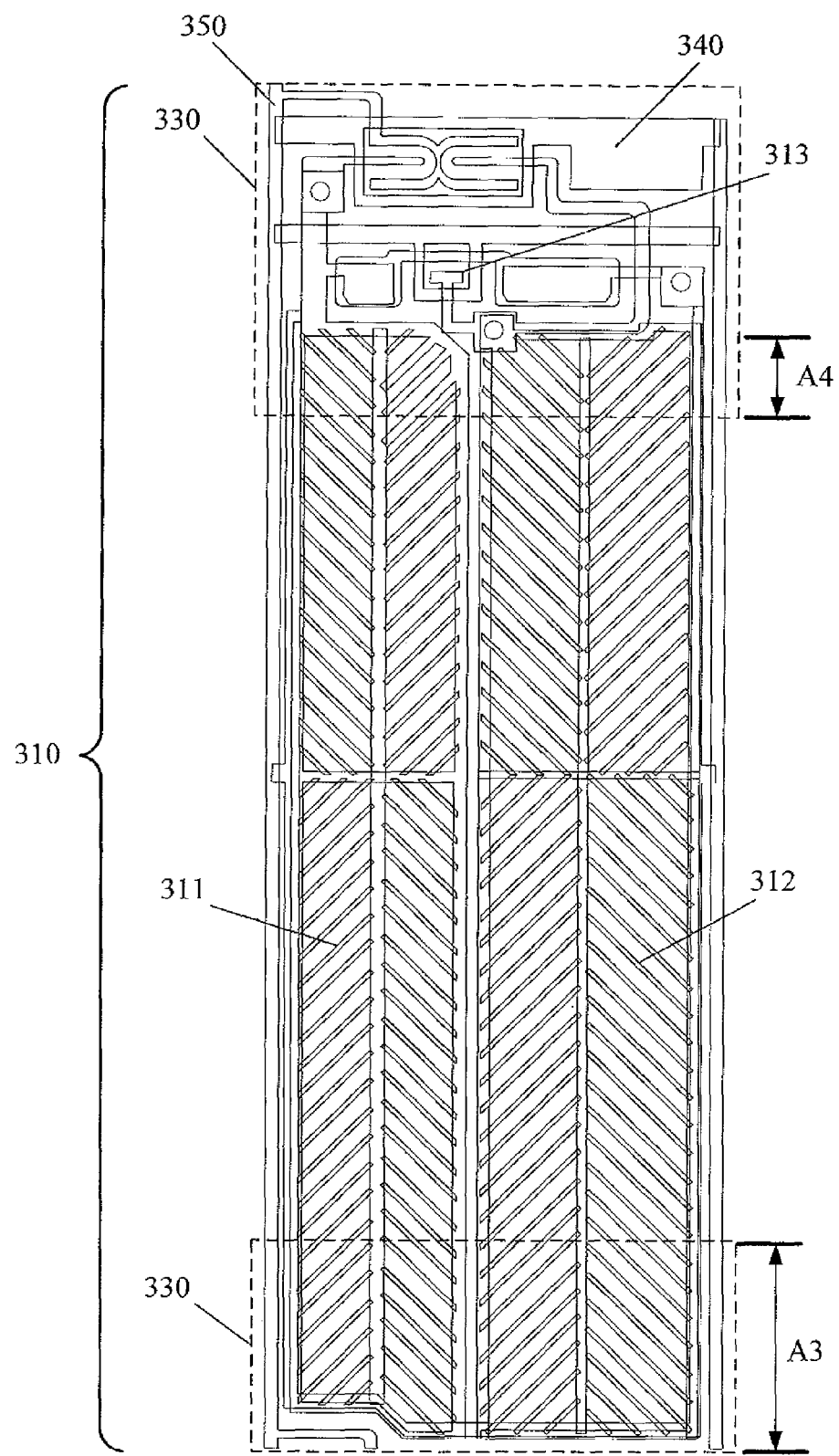
FIG. 4 is a partial enlarged view of FIG. 3.

Please refer to FIG. 4, FIG. 4 is a partial enlarged view of FIG. 3. In FIG. 4, only the first pixel 310 and the black matrix layer 330 are depicted to illustrate relative position of the black matrix layer 330 to the first pixel 310. For the first pixel 310, the total width (A3+A4) of areas covered by the black matrix layer 330 on the first main pixel 311 is the same as that of areas covered by the black matrix layer 330 on the first sub pixel area 312. In the same way, for the second pixel 320 the total width (A3+A4) of areas covered by the black matrix layer 330 on the second main pixel 321 is the same as that of areas covered by the black matrix layer 330 on the second sub pixel 322. Hence, for the first pixel 310, the ratio of domain region to the first main pixel 311 is the same as the ratio of domain region to the first sub pixel 312. As a result, the present invention liquid crystal display apparatus will not have the phenomenon of asymmetric display area. The problem of view angle deflection is thus resolved.

In contrast to the prior art, the present invention provides a liquid crystal display apparatus in which the main pixel and the sub pixel of each of the pixels are arranged in a different manner. The problem of asymmetric display area does not exist when portions of each of the pixels is covered by the black matrix layer. As a result, the drawback of view angle deflection is avoided.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display apparatus comprising:
   at least a scan line;
   at least a data line perpendicular to the scan line;
   a first pixel, comprising a first main pixel and a first sub pixel, the first main pixel and the first sub pixel arranged along a direction of the scan line;
   a second pixel adjacent to the first pixel, the second pixel comprising a second main pixel and a second sub pixel, the second main pixel and the second sub pixel arranged along the direction of the scan line; and
   a black matrix layer covering the first pixel and the second pixel, the black matrix layer covering portions of the first main pixel, the first sub pixel, the second main pixel, and the second sub pixel;
   wherein the first pixel and the second pixel are arranged along a direction of the data line.

2. The liquid crystal display apparatus as claimed in claim 1, wherein the liquid crystal display apparatus further comprises:
   a first thin film transistor coupled to the scan line, the data line, the first main pixel, and the first sub pixel for transmitting a data signal transmitted from the data line to the first main pixel and the first sub pixel according to a scan signal transmitted from the scan line.

3. The liquid crystal display apparatus as claimed in claim 1 being applied in a film pattern retarded (FPR) three-dimensional display apparatus.

4. The liquid crystal display apparatus as claimed in claim 3, wherein the first pixel is used for outputting left-eye images, the second pixel is used for outputting right-eye images, and the black matrix layer is used for preventing images corresponding to one eye of the viewer from entering another eye of the viewer to avoid the crosstalk problem.

5. A film pattern retarded three-dimensional display apparatus comprising:
   at least a scan line;
   at least a data line perpendicular to the scan line;

a first pixel, the first pixel comprising a first main pixel and a first sub pixel, the first main pixel and the first sub pixel arranged along a direction of the scan line;

a second pixel adjacent to the first pixel, the second pixel comprising a second main pixel and a second sub pixel, the second main pixel and the second sub pixel arranged along the direction of the scan line; and a black matrix layer covering the first pixel and the second pixel, the black matrix layer covering portions of the first main pixel, the first sub pixel, the second main pixel, and the second sub pixel;

wherein the first pixel and the second pixel are arranged along a direction of the data line.

6. The three-dimensional display apparatus as claimed in claim 5, wherein the three-dimensional display apparatus further comprises:

a first thin film transistor coupled to the scan line, the data line, the first main pixel, and the first sub pixel for transmitting a data signal transmitted from the data line to the first main pixel and the first sub pixel according to a scan signal transmitted from the scan line.

7. The three-dimensional display apparatus as claimed in claim 5, wherein the first pixel is used for outputting left-eye images, the second pixel is used for outputting right-eye images, and the black matrix layer is used for preventing images corresponding to one eye of the viewer from entering another eye of the viewer to avoid the crosstalk problem.

8. A film pattern retarded three-dimensional display apparatus comprising:

at least a scan line;

at least a data line perpendicular to the scan line;

a first pixel, the first pixel comprising a first main pixel and a first sub pixel;

a second pixel adjacent to the first pixel, the second pixel comprising a second main pixel and a second sub pixel; and a black matrix layer covering portions of the first main pixel, the first sub pixel, the second main pixel, and the second sub pix, and a width of an area covered by the black matrix layer on the first main pixel being the same as that of an area covered by the black matrix layer on the first sub pixel;

wherein the first pixel and the second pixel are arranged along a direction of the data line.

9. The three-dimensional display apparatus as claimed in claim 8, wherein the three-dimensional display apparatus further comprises:

a first thin film transistor coupled to the scan line, the data line, the first main pixel, and the first sub pixel for transmitting a data signal transmitted from the data line to the first main pixel and the first sub pixel according to a scan signal transmitted from the scan line.

10. The three-dimensional display apparatus as claimed in claim 8, wherein the first pixel is used for outputting left-eye images, the second pixel is used for outputting right-eye images, and the black matrix layer is used for preventing images corresponding to one eye of the viewer from entering another eye of the viewer to avoid the crosstalk problem.

* * * * *